US006850844B1

(12) United States Patent
Walters et al.

(10) Patent No.: US 6,850,844 B1
(45) Date of Patent: Feb. 1, 2005

(54) PORTABLE NAVIGATION DEVICE WITH INTEGRATED GPS AND DEAD RECKONING CAPABILITIES

(75) Inventors: Thomas H. Walters, Gardner, KS (US); Cliff A. Pemble, Olathe, KS (US); Min H. Kao, Leawood, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/184,844

(22) Filed: Jun. 28, 2002

(51) Int. Cl.[7] ............................................. G01C 21/00
(52) U.S. Cl. ..................................... 701/216; 701/208
(58) Field of Search ................................. 701/216, 208, 701/201, 207, 209, 211, 213, 217; 340/990, 995, 944, 945; 455/426.1, 67.11, 423, 456, 461; 342/357.1

(56) References Cited

U.S. PATENT DOCUMENTS

| | | | |
|---|---|---|---|
| 4,811,613 A | 3/1989 | Phillips et al. ............... 74/5.6 D |
| 4,831,563 A | 5/1989 | Ando et al. ............ 364/571.05 |
| 4,924,402 A | 5/1990 | Ando et al. .................. 364/449 |
| 5,208,756 A | 5/1993 | Song .......................... 364/449 |
| 5,220,509 A | 6/1993 | Takemura et al. ........... 364/449 |
| 5,331,563 A | 7/1994 | Masumoto et al. ......... 342/457 |
| 5,349,530 A | 9/1994 | Odagawa ..................... 364/449 |
| 5,363,306 A | 11/1994 | Kuwahara et al. ........... 364/449 |
| 5,396,430 A | 3/1995 | Arakawa et al. ............. 364/449 |
| 5,416,712 A * | 5/1995 | Geier et al. .................. 701/216 |
| 5,424,953 A | 6/1995 | Masumoto et al. ......... 364/449 |
| 5,506,774 A | 4/1996 | Nobe et al. ............. 364/424.05 |
| 5,508,931 A * | 4/1996 | Snider .......................... 701/207 |
| 5,528,248 A | 6/1996 | Steiner et al. ................ 342/357 |
| 5,657,231 A | 8/1997 | Nobe et al. ................ 364/449.3 |
| 5,689,809 A | 11/1997 | Grube et al. ................ 455/54.1 |
| 5,742,925 A | 4/1998 | Baba .......................... 701/221 |
| 5,786,789 A | 7/1998 | Janky ......................... 342/357 |
| 5,848,373 A | 12/1998 | DeLorme et al. ............ 701/200 |
| 5,852,791 A | 12/1998 | Sato et al. ................... 701/217 |
| 5,862,511 A | 1/1999 | Croyle et al. ................ 701/213 |
| 5,890,092 A | 3/1999 | Kato et al. ................... 701/216 |
| 5,938,721 A | 8/1999 | Dussell et al. ............... 701/211 |
| 6,067,046 A * | 5/2000 | Nichols .................. 342/357.14 |
| 6,125,325 A | 9/2000 | Kohli .......................... 701/213 |
| 6,182,006 B1 | 1/2001 | Meek .......................... 701/200 |
| 6,266,612 B1 | 7/2001 | Dussell et al. ............... 701/207 |
| 6,314,365 B1 * | 11/2001 | Smith .......................... 701/200 |
| 6,321,158 B1 | 11/2001 | DeLorme et al. ............ 701/201 |
| 6,353,798 B1 | 3/2002 | Green et al. ................. 701/213 |
| 6,362,779 B1 * | 3/2002 | Meek et al. ............. 342/357.13 |
| 6,373,430 B1 | 4/2002 | Beason et al. ........... 342/357.09 |
| 6,374,177 B1 | 4/2002 | Lee et al. .................... 701/200 |
| 6,374,179 B1 | 4/2002 | Smith et al. ................. 701/207 |
| 6,400,753 B1 | 6/2002 | Kohli et al. .................. 375/134 |
| 6,411,899 B2 | 6/2002 | Dussell et al. ............... 701/211 |
| 6,415,223 B1 | 7/2002 | Lin et al. ..................... 701/208 |
| 6,421,609 B2 | 7/2002 | Kohli .......................... 701/213 |
| 6,429,812 B1 * | 8/2002 | Hoffberg .................. 342/357.1 |
| 6,452,544 B1 | 9/2002 | Hakala et al. ........... 342/357.13 |
| 6,492,941 B1 | 12/2002 | Beason et al. ............. 342/357.1 |
| 6,529,824 B1 | 3/2003 | Obradovich et al. ......... 701/208 |
| 6,529,829 B2 | 3/2003 | Turetzky et al. ............. 701/213 |
| 6,553,308 B1 | 4/2003 | Uhlmann et al. ............ 701/208 |
| 6,574,558 B2 | 6/2003 | Kohli .......................... 701/213 |
| 6,594,617 B2 | 7/2003 | Scherzinger ................. 702/160 |
| 6,601,012 B1 | 7/2003 | Horvitz et al. .............. 702/150 |
| 2002/0077748 A1 * | 6/2002 | Nakano ....................... 701/209 |
| 2002/0091485 A1 * | 7/2002 | Mikuriya et al. ............ 701/208 |
| 2002/0169551 A1 | 11/2002 | Inoue et al. ................. 701/213 |
| 2003/0236818 A1 * | 12/2003 | Bruner et al. ................ 709/200 |

* cited by examiner

Primary Examiner—Marthe Y. Marc-Coleman
(74) Attorney, Agent, or Firm—Devon A. Rolf

(57) ABSTRACT

Apparatus, systems and methods are provided for portable navigation devices with various integrated positioning functionality. The apparatus includes a portable electronic device having a processor in communication with a memory. The memory is adapted to store navigation related data. The navigation related data includes cartographic data including a number of locations and data indicative of thoroughfares of a plurality of types connecting certain ones of the locations. The portable electronic device includes a GPS receiver adapted to communicate with the memory and processor. And, the portable electronic device includes a dead reckoning component, including a rate gyro, pedometer, and/or accelerometer adapted to communicate to memory and processor.

29 Claims, 7 Drawing Sheets

PORTABLE NAVIGATION DEVICE WITH INTEGRATED GPS AND DEAD RECKONING CAPABILITIES

CROSS REFERENCE TO RELATED APPLICATIONS

This application is related to the following co-pending, commonly assigned U.S. patent applications: "Systems and Methods with Integrated GPS and Dead Reckoning Functionality,", Ser. No. 10/184,373, "Rugged, Waterproof, Navigation Device with Touch Panel,", Ser. No. 10/186,155, and "Rugged, Waterproof, Navigation Device with Touch Panel,", Ser. No. 10/185,604, which are filed on even date herewith and which disclosures are herein incorporated by reference.

FIELD OF THE INVENTION

The present invention relates generally to navigation devices and, more particularly, to portable navigation devices with integrated Global Positioning System (GPS) and dead reckoning capabilities.

BACKGROUND OF THE INVENTION

Electronic navigation devices employing Global Positioning System ("GPS") receivers are known. The GPS includes a plurality of satellites that are in orbit about the Earth. The orbit of each satellite is not necessarily synchronous with the orbits of other satellites and, in fact, is likely asynchronous. The GPS receiver device receives spread spectrum GPS satellite signals from the various satellites. The spread spectrum signals continuously transmitted from each satellite utilize a highly accurate frequency standard accomplished with an extremely accurate atomic clock. Each satellite, as part of its data signal transmission, transmits a data stream indicative of that particular satellite. The GPS receiver device acquires spread spectrum GPS satellite signals from at least three satellites to calculate its two-I dimensional position by triangulation. Acquisition of an additional signal, resulting in signals from a total of four satellites, permits the GPS receiver device to calculate its three-dimensional position. In this manner, an electronic navigation device employing a GPS receiver has the ability to accurately compute the position of the device in real time, even as the device moves. One example of an electronic navigation device is the eMAP portable electronic map manufactured by Garmin International.

Although GPS enabled devices are often used to describe navigation devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine an approximate location of the receiving unit.

In recent years, attempts have been made to combine navigation and geographic positioning services on other types of multipurpose devices, e.g. PDAs, cell phones and other intelligent appliances/apparel of the like. PDAs, for example, are small, substantially hand-held computers that are used for storing, manipulating and retrieving data. One example of a PDA is the Palm Pilot® manufactured by 3Com Corporation.

Plug-in GPS receiver modules for PDAs are known. There are problems associated with various plug-in GPS receiver modules and PDAs. One problem is that a PDA with a plug-in GPS receiver module is cumbersome to handle and use. Two separate devices must be handled. Additionally, the plug-in GPS receiver module and the PDA do not function together to provide integrated PDA features.

Further, among portable electronic navigation devices, including PDAs with plug-in receiver modules, there does not exist a back-up mechanism for continuing navigation related services when positioning signal reception is lost. This is particularly problematic when such devices are used in "urban-canyons" such as street level in a city beneath towering sky scrapers which "shade" or block satellite reception. Likewise, such devices typically lose their navigation related services once they are taken indoors within buildings.

Therefore, there exists a need for a portable electronic device that incorporates triangulation positioning functionality with a complementary navigation related functionality such that the device can continue to provide navigation related services in "urban-canyons" or indoors. Further, there exists a need for a portable electronic device that integrates triangulation positioning functionality with other handheld device functionality, e.g. cell phone and/or PDA functionality, in a manner which is not cumbersome to handle or to use.

SUMMARY OF THE INVENTION

The above mentioned problems of navigational devices are addressed by the present invention and will be understood by reading and studying the following specification. Apparatus, systems and methods are provided for portable navigation devices which incorporate triangulation positioning functionality with a complementary navigation related functionality such that the device can continue to provide navigation related services in "urban-canyons" or indoors. Further, in some embodiments, the apparatus, systems and methods integrate triangulation positioning functionality with other handheld device functionality, e.g. cell phone and/or PDA functionality, in a manner which is not cumbersome to handle or to use.

In one embodiment of the present invention, a portable electronic device having a processor in communication with a memory. The memory is adapted to store navigation related data. The navigation related data includes cartographic data including a number of locations and data indicative of thoroughfares of a plurality of types connecting certain ones of the locations. The portable electronic device includes a GPS receiver adapted to communicate with the memory and processor. And, the portable electronic device includes a dead reckoning component, including a rate gyro and/or accelerometer adapted to communicate to memory and processor. The device is adapted to track location of the device using the GPS receiver when GPS service is available and the device is adapted to track a location of the device using the dead reckoning component in complement to the GPS receiver when GPS service is degraded.

These and other aspects, embodiments, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to, among other things, apparatus, systems and methods for a portable electronic device that incorporate triangulation positioning functionality with a back-up navigation related service such that the device can continue to provide navigation related services in "urban-canyons" or indoors. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
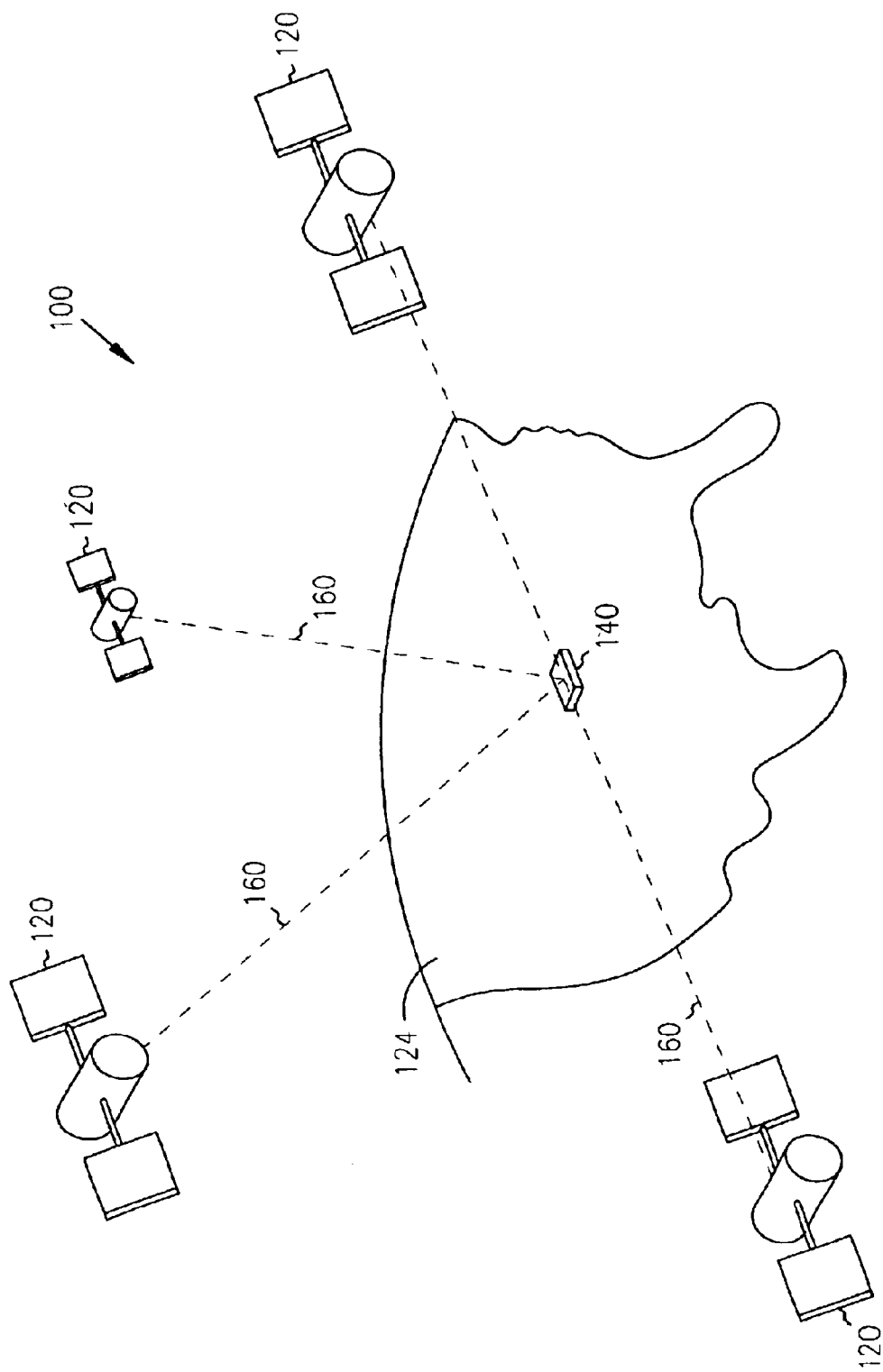
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
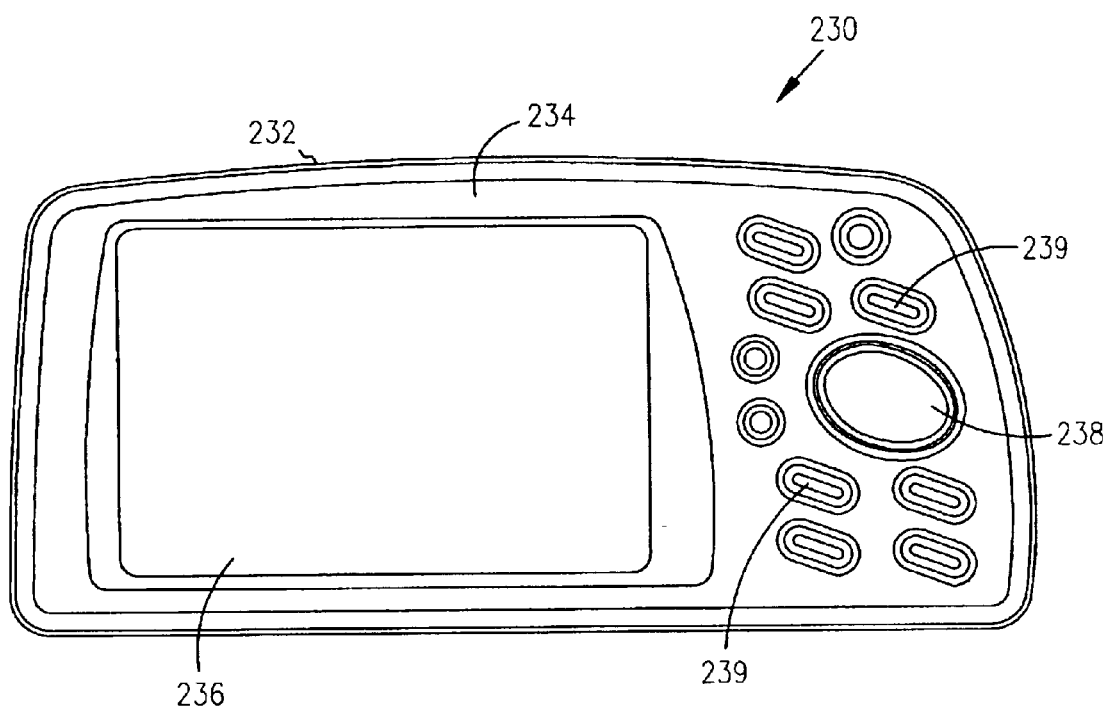
FIGS. 2A and 2B illustrate views for one embodiment of an electronic navigational device according to the teachings of the present invention.

FIG. 2A and 213 illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

Figure 2B:
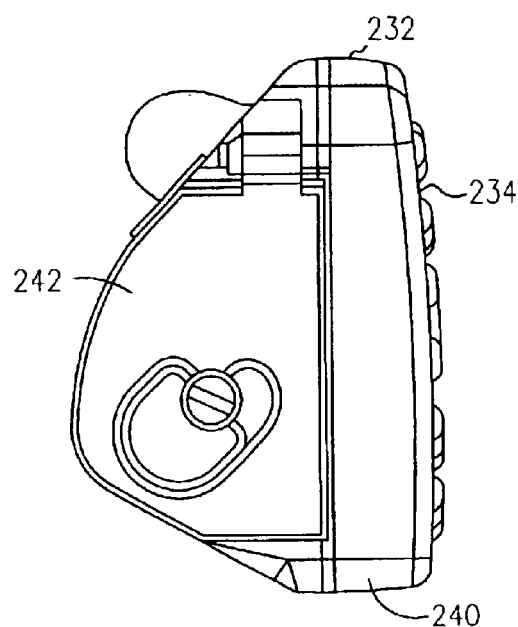

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

Figure 3A:
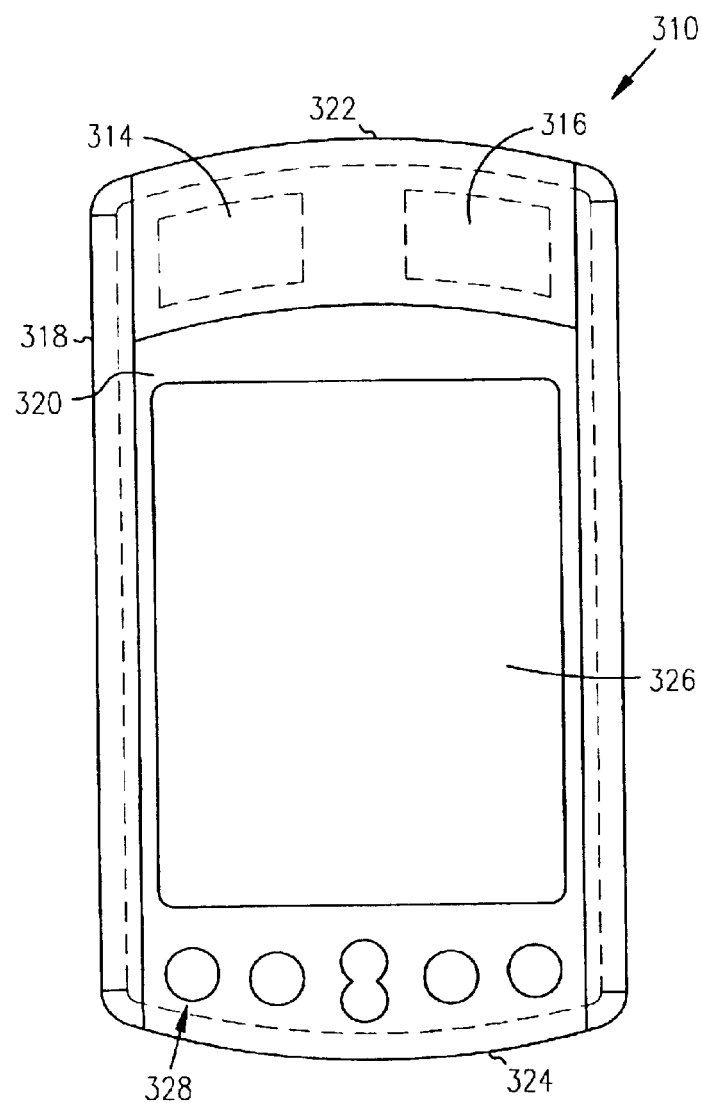
FIGS. 3A–3C illustrate views for another embodiment of an electronic navigational device according to the teachings of the present invention.
Figure 3B:
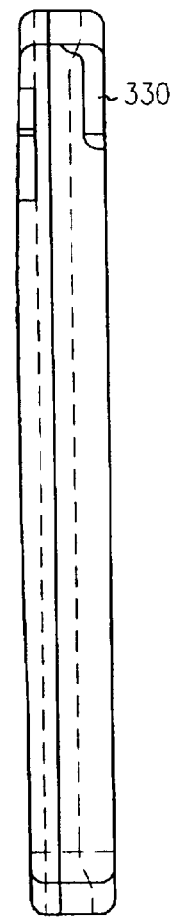
Figure 3C:
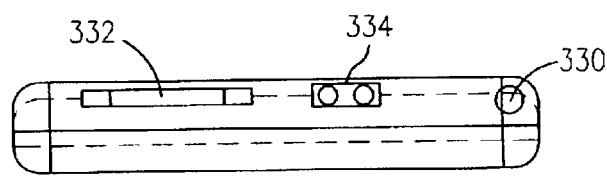

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

Thus, FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
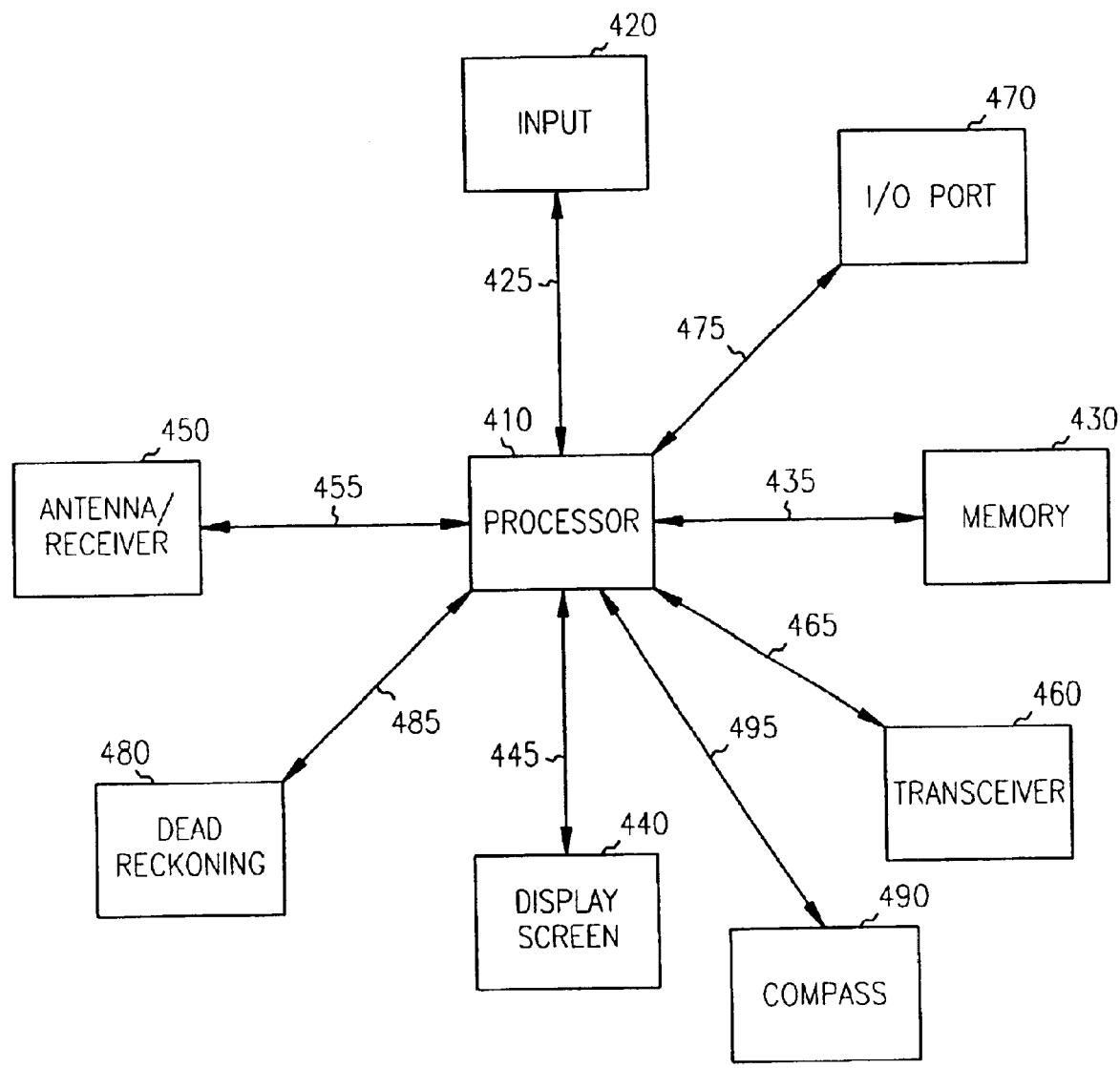
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components of the embodiment shown in FIG. 4A include a transceiver 460 which is coupled to the processor 410 via line 465. The electronic components include I/O ports 470 connected to processor 410 via line 475. The components shown in the embodiment of FIG. 4A can further include a compass 490. As one of ordinary skill in the art will understand upon reading this disclosure, the compass 490 can include a magnetic flux gate compass or other electronic compass design and be communicatively coupled to the processor via 495. The electronic components further include at least one dead reckoning component 480 connected to the processor 410 via line 485. According to the teachings of the present invention, the at least one dead reckoning component includes, by way of example and not by way of limitation, a rate gyro, pedometer, and/or an accelerometer as the same are known and understood by one of ordinary skill in the art. One of ordinary skill in the art will appreciate, upon reading this disclosure, that other dead reckoning components suited to provide the advantages of the present invention are considered equally within the scope of the present invention.

Figure 4B:
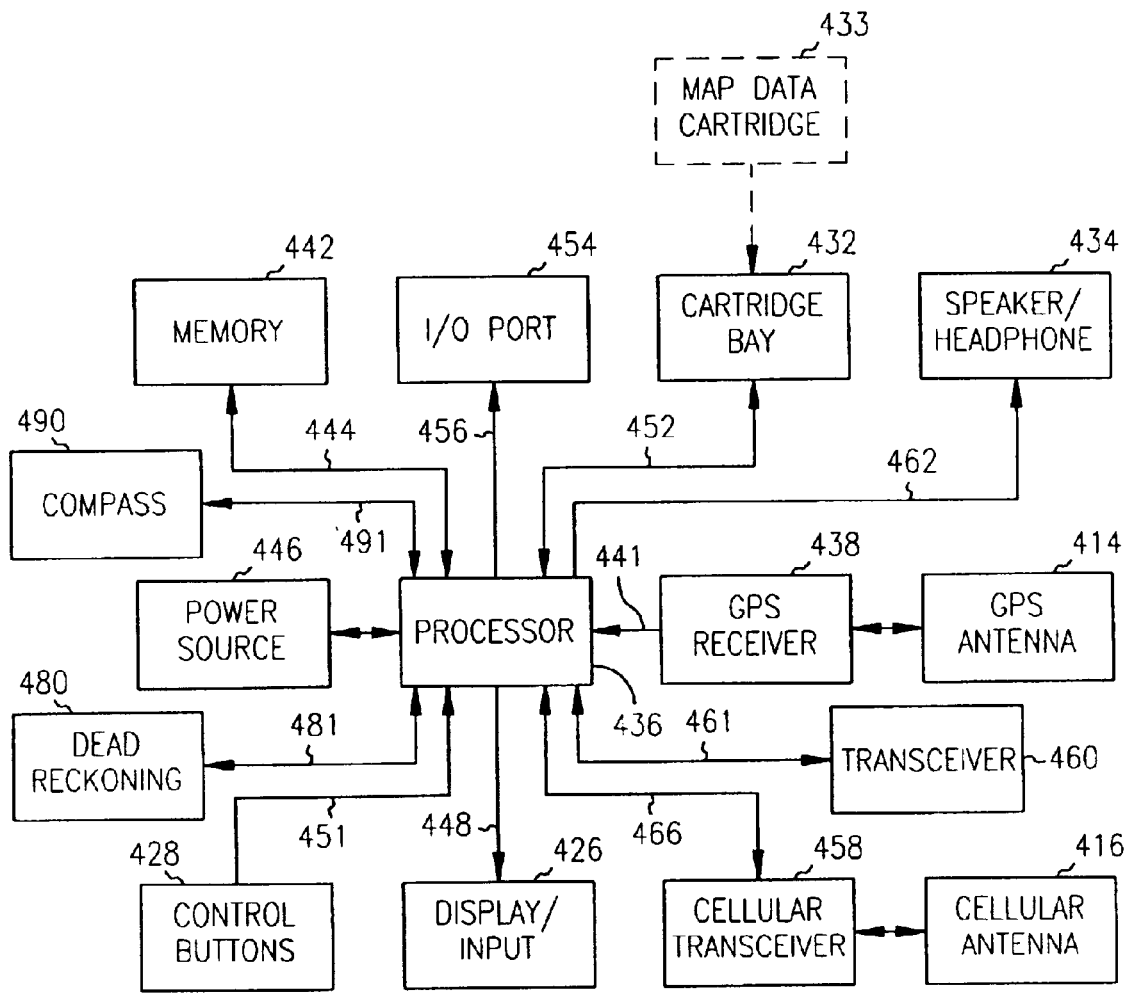
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. In some embodiments the power source includes batteries internal to the PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The components shown in the embodiment of FIG. 4B can further include a compass 490. As one of ordinary skill in the art will understand upon reading this disclosure, the compass 490 can include a magnetic flux gate compass or other electronic compass design and be communicatively coupled to the processor via 491. The PDA 310 may also include an infrared port (not shown) coupled to the processor 436 that may be used to beam information from one PDA to another. The same will be explained in more detail below.

According to the teachings of the present invention, and as shown in the embodiments of FIGS. 4A and 4B, the electronic components of the present invention include a memory, shown as 442 in FIG. 4B, which is adapted to store and/or house a set of executable instructions, programs, and/or program modules. For ease of illustration, the memory will be discussed in reference to FIG. 4B where in the memory 442 is coupled to the processor 436 via line 444. As one of ordinary skill in the art will appreciate, the memory 442 is adapted to communicate with the processor 436. In the invention, the memory 442 is further adapted to store or house navigation related data and is adapted to house or store software operable to perform routing algorithms. Examples of such routing algorithms include, but are not limited to, routing algorithms as described in commonly assigned applications entitled; "Systems and Methods for a Navigational Device with Improved Route Calculation Capabilities," application Ser. No. 10/028,057. U.S. Pat. No. 6,545,637, "Systems and Methods for a Navigational Device with Forced Layer Switching Based on Memory Constraints," application Ser. No. 10/027,159, U.S. Pat. No. 6,581,003, "Navigation System. Method and Device with Automatic Next Turn Page," application serial number 10/029,917, "Navigation System, Method and Device with Voice Guidance," application Ser. No. 10/029,732, "Navigation System. Method and Device with Detour Algorithm," application Ser. No. 10/028,343, each of which is incorporated herein by specific reference.

According to the teachings of the present invention, the navigation related data includes cartographic data. The cartographic data includes a number of locations and data indicative of thoroughfares of a plurality of types connecting certain ones of the locations. In one embodiment, the navigation related data includes a calculated route between at least two of the number of locations. Further, according to the teachings of the present invention, the software stored or housed within memory 442 includes software operable to perform one or more applications for navigation. As used herein, software operable to perform one or more applications for navigation includes, but is not limited to, software operable to find points of interest. In one embodiment, the navigation related data includes navigation data selected from the group of a number of waypoints, a planned route, and points of interest. In one embodiment, the points of interest include points of interest selected from the group of geographical points of interest, entertainment venues, dining venues, historical points of interest, and lodging venues. In one embodiment, the navigation related data includes navigation data selected from the group of automobile navigation data, marine craft navigation data, pedestrian navigation data, and hiking navigation data In one embodiment, the device is GPS enabled. In this embodiment, the software is operable to calculate an estimated time of arrival of the device to the a desired destination using an integrated GPS capability of the device.

In the invention, the memory 442 is adapted to store or house software operable to perform handheld computing operations. Examples of such handheld computing operations include those typically found within the functionality of a handheld computing device such as; retrieving an address from an address book, entering an address in an address book, retrieving a phone number from a phone list, adding a phone number to the phone list, and adding an entry in a to-do list.

However in some embodiments, the memory 442 in the present invention is further adapted to store or house software operable for adding a waypoint as an address in the address book, adding a point of interest as an address in the address book, and storing a planned route. For example, the software, embodied as a computer executed set of instructions, are adapted to identify a waypoint based on a triangulation positioning determined location and then create an address book entry to be associated with the identified waypoint. Similarly, the software is adapted to identify a waypoint based on a cursor position on an electronic map and then to create an address book entry to be associated with the identified waypoint. Further the software is adapted to create an address book entry, and then identify a waypoint associated with the address book entry. Detailed discussions of the same are described in a commonly assigned application entitled; "PDA with Integrated Address Book and Electronic Map Waypoints," application Ser. No. 10/032,032, which is incorporated herein by specific reference.

According to the teachings of the present invention, and as shown in the embodiments of FIGS. 4A and 4B, the electronic components of the present invention include a transceiver shown as 460 which is coupled to the processor. For ease of illustration, the transceiver will be discussed in reference to FIG. 4B where the transceiver 460 is couple to the processor 436 via line 461. The description, however, applies analogously to the electronic components shown in FIG. 4A. As stated above, the memory is adapted to store or house software. According to the teachings of the present invention, software is provided which includes a set of executable instructions, programs, and or program modules adapted to control transceiver 460 such that the transceiver 460 can transmit and receive navigation data between a handheld electronic device and an other portable and/or handheld device. For example, in one embodiment, the software includes a set of executable instructions adapted to transmit and receive the navigation related data via a commercial communications network.

One example of a commercial communications network includes an analog cellular network using plain old telephone service (POTS). Another example of a commercial communications network to which the present invention is adapted includes a digital packet switched cellular network such as a personal communications service (PCS) network. As one of ordinary skill in the art will understand upon reading this disclosure, the transceiver 460 of the present invention is adapted to transmit and receive navigation related data via the Internet using Internet Protocol (IP). Thus, the present invention includes a handheld electronic device which is adapted to transmit and receive navigation related data over a wide area network (WAN) using any number or combination of hardwired and/or wireless communication channels. For instance, the transceiver of the present invention is adapted to transmit and receive navigation related data using a wireless application protocol (WAP). However, as one of ordinary skill in the art will understand upon reading and comprehending this disclosure, the invention is not limited to single one or particular combination of WAN communication channels or protocols. That is the transceiver can be instructed to transmit and receive navigation related data in a 3G GSM/CDMA network, and other networks of the like.

Similarly, according to the teachings of the present invention, the transceiver 460 is adapted to transmit and receive navigation related data over a local area network (LAN). In this embodiment, the transceiver 460 is adapted to operate in a short range network and wirelessly transmit and receive the navigation related data between a handheld electronic device and an other portable and/or handheld electronic device using either infra-red signaling and/or a Bluetooth signaling technology as the same are know and understood by one of ordinary skill in the art.

The invention is not so limited. As one of ordinary skill in the art will understand qpon reading this disclosure, the portable and/or handheld electronic devices described herein include multipurpose devices, e.g. PDAs, cell phones and other intelligent appliances/apparel of the like, which can wirelessly transmit navigation related data from one such device to another. That is, in one embodiment, according to the teachings of the present invention, the handheld electronic device includes devices selected from the group of cell phones, intelligent apparel, and PDAS. In one embodiment, the other portable and/or handheld electronic device similarly includes devices selected from the group of cell phones, intelligent apparel, and PDAs.

According to the teachings of the present invention, and as shown in the embodiments of FIGS. 4A and 4B, the electronic components of the present invention include a dead reckoning component shown as 480 which is coupled to the processor. For ease of illustration, the dead reckoning component 480 will be discussed in reference to FIG. 4B where the dead reckoning component 480 is coupled to the processor 436 via line 481. The description, however, applies analogously to the electronic components shown in FIG. 4A. As stated above, the memory is adapted to store or house software. According to the teachings of the present invention, software is provided which includes a set of executable instructions, programs, and or program modules adapted to control the dead reckoning component 480 such that the dead reckoning component 480 can be activated and provide navigation services to the device.

As identified herein, the present invention provides a portable electronic device which includes both a triangulation positioning and a dead reckoning positioning functionality. In one embodiment, the triangulation positioning functionality includes a GPS functionality and the dead reckoning functionality includes at least one component selected from the group of a rate gyro and an accelerometer. The invention, however, is not so limited. In the invention, the processor of the device is adapted to operate on a set of computer executable instructions to determine, or resolve, a position of the device when the triangulation positioning service and/or signals are available. The processor of the device further adapted to operate on the set of computer executable instructions to determine, or resolve, a position of the device using the dead reckoning functionality when the triangulation positioning functionality is interrupted or otherwise degraded. Thus, the triangulation positioning functionality and the dead reckoning positioning functionality are adapted to operate in complement to one another. In some embodiments, one of either the triangulation positioning functionality or the dead reckoning positioning functionality can be used to calibrate the other functionality when the one exhibits a high level of accuracy or when a high level of confidence in accuracy is determined within the particular one. In this manner the present invention allows for the device to continue processing and/or tracking a location or position of the device when such triangulation positioning services are interfered with such as in "urban canyons" or when the device is indoors. Similarly, device can thus continue navigating a route for the device as the same is described herein.

As shown in FIGS. 4A and 4B, the device further includes a display in communication with the processor and the memory, e.g. display 426 in FIG. 4B. The display is adapted to display all or part of a "convergence" and/or a "solution." As used herein, the terms convergence and/or solution are intended to mean a complete path provided by the thoroughfares of a plurality of types connecting certain ones of the number of locations in the cartographic data. According to the teachings of the present invention, the device incorporates these and other functions as will be explained in more detail below in connection with FIGS. 6–8.

Figure 5:
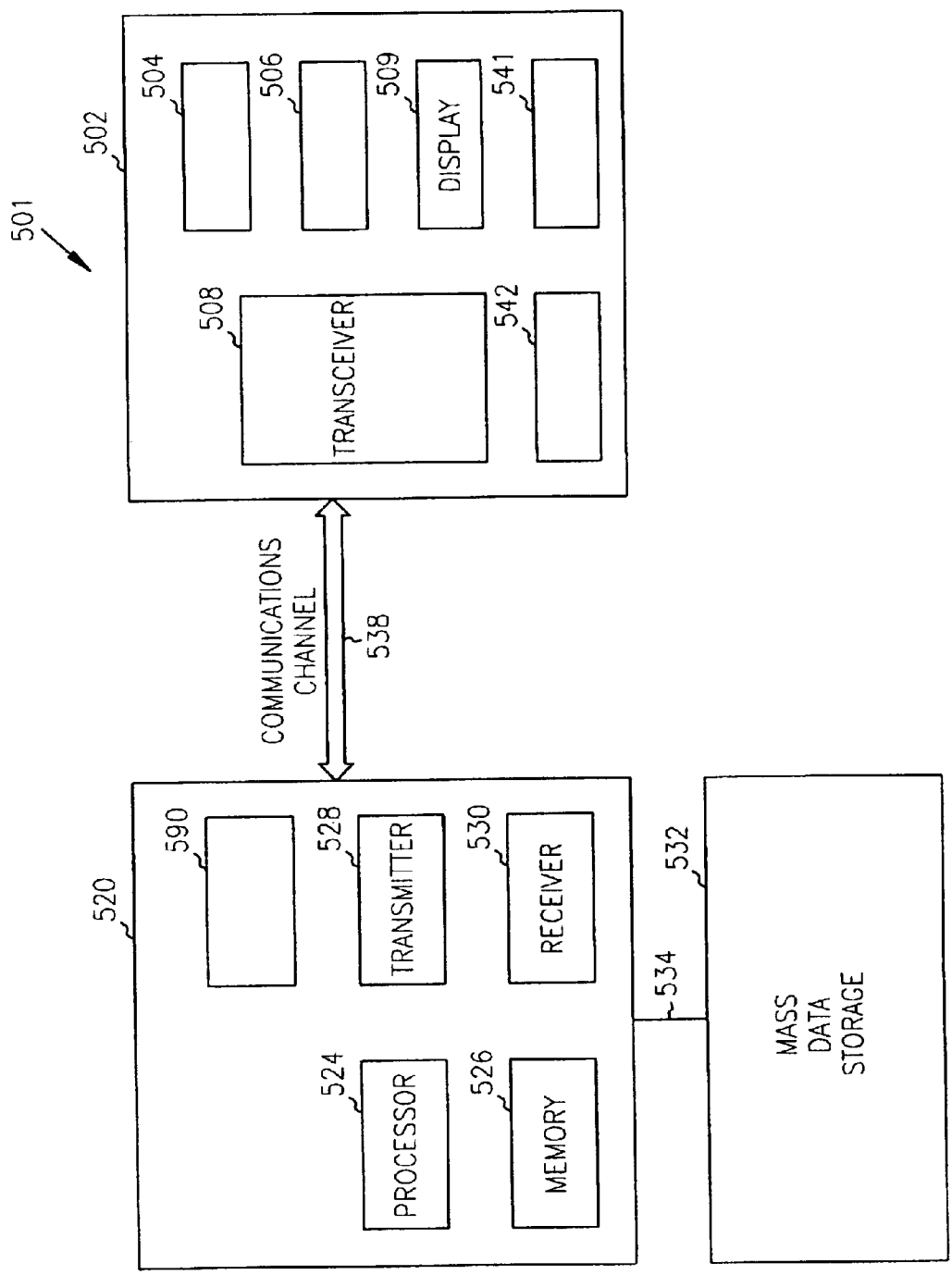
FIG. 5 is a block diagram of another embodiment for a navigation system according to the teachings of the present invention.

FIG. 5 is a block diagram of an embodiment of a navigation system 501 according to the teachings of the present invention. In the embodiment of FIG. 5, the invention includes a first and a second navigation device, 502 and 520. According to the teachings of the present invention, the first navigation device 502 includes, but is not limited to a first thin client 502 selected from the group of a cell phone, a PDA, an intelligent appliance, an article of intelligent apparel, or any thin client of the like. As one of ordinary skill in the art will understand upon reading this disclosure, the first navigation device 502 includes a first thin client having hardware and electronic components as described in detail above in connection with FIGS. 2A–4B. The first navigation device 502 includes a processor 504, a memory 506, and a transceiver 508 adapted to communicate with one another. In the invention, the first navigation device 502 includes both a triangulation positioning component 541 and a dead reckoning positioning component 542, as the same have been described herein, which are additionally adapted to communicate with the processor 504, a memory 506, and a transceiver 508.

According to the teachings of the present invention, the memory 506 is adapted to store navigation related data. The navigation data includes navigation data as explained and described in detail above in connection with FIGS. 4A and 4B. Thus, the navigation related data includes cartographic data including a number of locations and data indicative of thoroughfares of a plurality of types connecting certain ones of the locations. And, the memory 506 is adapted to store software including software operable to perform routing algorithms, and other navigation related applications as the same have been described herein.

As shown in FIG. 5, the navigation system 501 includes a larger client 520, such as a desktop computer, laptop computer, and/or server 520. According to one embodiment, the larger client, e.g. server 520, includes a processor 524 operably coupled to memory 526, and further includes a transmitter 528 and a receiver 530 to send and receive data, communication signals, and/or other propagated signals. The transmitter 528 and receiver 530 are selected or designed according to the communication requirements and the communication technology used in the communication design for the navigation system 501. As one of ordinary skill in the art will understand upon reading this disclosure, the functions of the transmitter 528 and the receiver 530 may be combined into a single transceiver.

According to the teachings of the present invention as shown in the embodiment of FIG. 5, the server 520 includes a remote server 520. According to other embodiments of the navigation system 501, the server 520 includes a network server located on a local area network (LAN), wide area network (WAN), a virtual private network (VPN) and server farms. As described herein the server 520 is adapted to communicate with one or more thin navigation devices, e.g. first navigation device 502. According to the teachings of the present invention, the remote server memory 526 is adapted to store navigation related data. As described above, the navigation related data includes, among other things, cartographic data including a number of locations and data indicative of thoroughfares of a plurality of types connecting certain ones of the locations. Further, the remote server memory 526 is adapted to store software including software operable to perform routing algorithms as the same have been described above. In one embodiment of the present invention, the remote server processor 524 operates on a route calculation algorithm, stored or housed in memory 526 to find a convergence between any two of the number of locations.

As shown in FIG. 5, the remote server 520 and at least one of the first navigation device are adapted to communicate with, e.g. to transmit and receive, navigation data back and forth between one another via a communication channel 538. In one embodiment according to the teachings of the present invention, the communication channel 538 includes a wireless channel. As one of ordinary skill in the art will understand upon reading this disclosure, the communication channel 538 is not limited to a particular communication technology. Additionally, the communication channel 538 is not limited to a single communication technology; that is, the channel 538 may include several communication links that use a variety of technology. For example, according to various embodiments, the communication channel 538 is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, the Internet, radio-frequency (RF) waveguides, the atmosphere, and empty space. Furthermore, according to various embodiments, the communication channel 538 includes intermediate devices such as routers, repeaters, buffers, modems, transmitters, and receivers, for example.

In one embodiment, for example, the communication channel 538 includes telephone and computer networks.

Furthermore, in various embodiments, the communication channel 538 is capable of accommodating wireless communication such as radio frequency, microwave frequency and infrared communication, and the like. Additionally, according to various embodiments, the communication channel 538 accommodates satellite communication.

In the invention, the communication signals transmitted through the communication channel 538 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), third generation (3G) GSM/CDMA, and the like. Both digital and analog signals may be transmitted through the communication channel 538. According to various embodiments, these signals are modulated, encrypted and/or compressed signals as may be desirable for the communication technology.

According to the teachings of the present invention, the server processor 524 is adapted to respond to a request from one or more navigation devices, e.g. first navigation device 502, by performing calculations on the cartographic data and transmitting results, using transmitter 528, to the first navigation device 502. According to the teachings of the present invention, the server 520 is adapted to transmit, and the first navigation device 502 is adapted to receive, the navigation data in a manner as explained and described in detail above in connection with FIGS. 4A and 4B. In one embodiment of the present invention, the remote server processor 524 operates on a route calculation algorithm, stored or housed in memory 526 to find a convergence between any two of the number of locations. Thus, according to the teachings of the present invention, server memory 526 is adapted to house or store software which provides instructions for the processor 524 and allows the server 520 to provide services to the navigation device 502. Although only a single thin client navigation device 502 is illustrated in FIG. 5, one of ordinary skill in the art will understand upon reading this disclosure that any number of thin clients can communicate with the server 520, according to the teachings of the present invention.

Likewise, the first navigation device 502 is adapted to transmit navigation related data to the server 520 in a manner as explained and described in detail above in connection with FIGS. 4A and 4B. Thus, the first navigation device 502 is adapted to transmit track logs and the like to server 520 for storage and/or processing. Reciprocally, the first navigation device 502 is adapted to communicate with and retrieve navigation data from the remote server 520 using cellular communication technology, e.g. a PCS digital cellular packet switched service.

As shown in the embodiment of FIG. 5, the navigation system 501 further includes a mass data storage 532 coupled to the server 520 via communication link 534. The mass data storage 532 is adapted to store or house navigation data. One of ordinary skill in the art will understand, upon reading and comprehending this disclosure, that the mass data storage 532 can be a separate device from the server 532 and/or can be incorporated into the server 520.

According to one embodiment of the present invention, one service provided by the server 520 involves processing requests from one or more navigation devices, e.g. thin client 502, and transmitting navigation data from the mass data storage 532 to the first navigation device 502. According to one embodiment, another service provided by the server 520 includes processing the navigation data using various algorithms for a desired navigation application, e.g. performing a route calculation or finding points of interest, and sending the results of the processing to one or more navigation devices, e.g. thin client 502.

In this embodiment of the present invention, the mass data storage 532 includes sufficient memory for a multitude of desired navigation applications. Examples of mass data storage 532 include magnetic data storage media such as hard drives, optical data storage media such as CD ROMs, charge storing data storage media such as Flash memory, and include molecular memory, such as now known or hereinafter developed.

As one of ordinary skill in the art will understand upon reading this disclosure, the systems in FIG. 5 can further operate on signals, e.g. triangulation positioning and/or rate gyro data signals, originally received or produced by the one or more navigation devices, e.g. thin client 502. As one of ordinary skill in the art will understand upon reading and comprehending this disclosure, a user of the first navigation device 502 can be proximate to or accompanying the first navigation device 502. The invention however, is not so limited.

As one of ordinary skill in the art will appreciate upon reading this disclosure, the first and the second navigation devices, 502 and 520, include displays, 509 and 590 respectively. According to some embodiments of the present invention, the first and the second navigation devices, 502 and 520 are adapted to display the navigation related data on their respective displays, e.g. 509 and 590. Thus, in one embodiment of the present invention, the first and the second navigation devices, 502 and 520, are adapted to display a route calculated using the software housed or stored in the memory of the navigation device. Additionally, however, the first and the second navigation devices are adapted to display a route calculated on an other navigation device, e.g. 502, 520 or otherwise, using software stored or housed in that other navigation device and then transmitted to and received by the first and/or second navigation device, 502 and 520. For example, the first navigation device 502 is adapted to calculate a route, find a point of interest, retrieve a map, or perform any other related navigation application and then transmit the results to the second navigation device 520 using its transceiver, as the same has been described in detail above, where the navigation related results will be displayed.

Likewise, the second navigation device, e.g. server 520, can calculate a route, find a point of interest, retrieve a map, or perform any other related navigation application upon receiving a request from the first navigation device 502, even retrieving navigation relate data from the mass storage device 532, and then transmit the results to one or more navigation devices, e.g. thin clients 502, where the navigation related results will be displayed.

According to the teachings of the present invention, a first navigation device 502, which has a triangulation positioning and a dead reckoning functionality, is adapted to display, on a respective display such as 509, a location of the first navigation device on a cartographic map. Further, according to the teachings of the present invention, the first navigation device 502 is adapted to transmit the location of the first navigation device 502, in the manner described in detail above, to any one or more other navigation devices, and any number of remote servers, e.g. server 520, to be displayed thereon on a cartographic map to track its location.

Thus, by way of example and not by way of limitation, in one embodiments of the present invention a route is calculated on the second navigation device 520, operating on a set of navigation data received by the second navigation device 520, using receiver 536, from the first navigation device 502. The route is then transmitted to the first navigation device 502 from the second navigation device using its transmitter 528. The first navigation device can, using its triangulation positioning and dead reckoning components, 541 and 542, track its movement along the calculated route. And, in some embodiments of the present invention, the first navigation device is adapted to navigate the route to a desired destination using audio and visual guides. Thus, the first navigation device can display its location or position on a cartographic map on the display 509 of the first navigation device 502. And additionally, the movement and location of the first navigation device can be tracked and displayed on a cartographic map on a display 590 connected to server 520.

One of ordinary skill in the art will understand upon reading this disclosure, the many combinations in which a handheld electronic device can share tasks, resources, and information in a system, according to the teachings of the present invention, between a first navigation device 502 and a second navigation device 520. The invention is not so limited to the examples given above. The features and functionality explained and described in detail above in connection with the device of FIGS. 4A and 4B are likewise available in the systems of FIG. 5.

Figure 6:
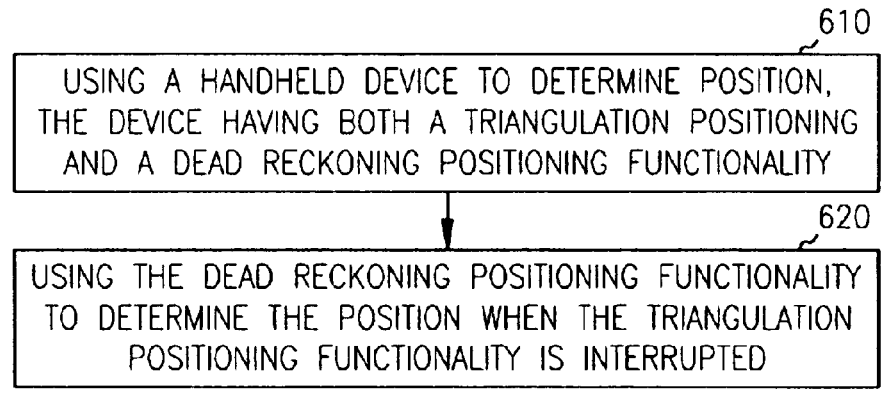
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method for navigation using a portable electronic device that incorporate triangulation positioning functionality with a complementary navigation related functionality such that the device can continue to provide navigation related services in "urban-canyons" or indoors. As described above, a processor, memory, transceiver, triangulation positioning component, and at least one dead reckoning component are used for processing signals which include input data from input devices, e.g. keypads, other input keys, or other inputs, GPS signals from GPS receiver, rate gyro data signals, and data received from I/O ports in order to perform the methods described herein. As shown in FIG. 6, the method includes using a handheld navigation device to determine a position at block 610. The handheld navigation device includes both a triangulation positioning and a dead reckoning positioning functionality. In one embodiment, using the handheld navigation device, having both a triangulation positioning functionality and a dead reckoning positioning functionality, to determine a position further includes using the handheld navigation device to track a movement of the handheld navigation device. In one embodiment, using the handheld navigation device including a triangulation positioning functionality includes using a handheld GPS enabled device. In one embodiment, using the handheld navigation device including a dead reckoning functionality includes using a handheld navigation device which includes at least one component selected from the group of a rate gyro, a pedometer, and an accelerometer. As shown in FIG. 6, the method further includes using the dead reckoning positioning functionality to determine the position when the triangulation positioning functionality is interrupted, or otherwise degraded, as shown in block 620.

As described herein, in one embodiment using the handheld navigation device to determine a position includes using a multifunction device. In this embodiment, the multifunction device includes a multifunction device selected from the group of a Personal Digital Assistant (PDA) enabled device and a cell phone enabled device. In one embodiment, the method further includes performing a route calculation. In some embodiments, the method further includes retrieving navigation related data from a memory of the handheld navigation device. Herein, retrieving navigation related data from a memory of the handheld navigation device includes retrieving navigation related data selected from the group of a number of waypoints, a planned route, and points of interest. In one embodiment, retrieving navigation related data for points of interest includes retrieving points of interest selected from the group of geographical points of interest, entertainment venues, dining venues, and lodging venues. Further, in the invention, the navigation related data includes navigation data selected from the group of automobile navigation data, marine craft navigation data, pedestrian navigation data, and hiking navigation data.

Figure 7:
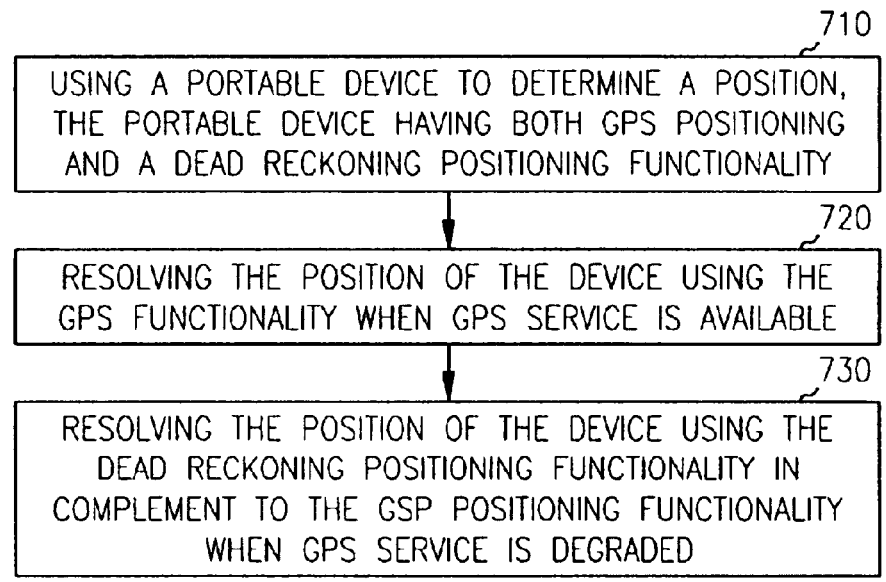
FIG. 7 is a flow diagram of another embodiment of a navigation aid method according to the teachings of the present invention.

FIG. 7 is a flow diagram of another embodiment of a navigation aid method according to the teachings of the present invention. The navigation aid method includes a method for navigation using a portable electronic device that incorporates triangulation positioning functionality with a complementary navigation related functionality such that the device can continue to provide navigation related services in "urban-canyons" or indoors. As described above, a processor, memory, transceiver, compass, triangulation positioning component, and at least one dead reckoning component are used for processing signals which include input data from input devices, e.g. keypads, other input keys, or other inputs, GPS signals from a GPS receiver, rate gyro data signals, accelerometer data signals, compass signals, pedometer signals, and data received from I/O ports in order to perform the methods described herein. As shown in FIG. 7, the method includes using a portable device to determine a position in block 710. In this embodiment of the present invention, the portable device includes both a GPS positioning and a dead reckoning positioning functionality, including at least one of a rate gyro, pedometer or odometer, and an accelerometer. In one embodiment, using a portable device to determine a position includes using a portable device selected from the group of a cell phone, a PDA, and an article of intelligent apparel.

In block 720 the method includes resolving the position of the device using the GPS positioning functionality when GPS service is available. And, in block 730, the method includes resolving the position of the device using the dead reckoning functionality in complement to the GPS functionality when GPS service is degraded. In some embodiments the method includes using one of the GPS positioning functionality and the dead reckoning positioning functionality to calibrate the other when a high level of confidence in accuracy is determined with the one.

As discussed above, in some embodiments of the present invention the method further includes software operable on the portable device for; maintaining a track log, storing one or more waypoints, planning a route, and finding points of interest. In some embodiments of the present invention, using a portable device to determine a position includes using a multifunction device. In such embodiments, the method further includes; retrieving an address from an address book, adding a waypoint as an address in the address book, adding a point of interest as an address in the address book, storing a planned route, retrieving a phone number from a phone list, adding a phone number to the phone list, and adding an entry in a to-do list.

Figure 8:
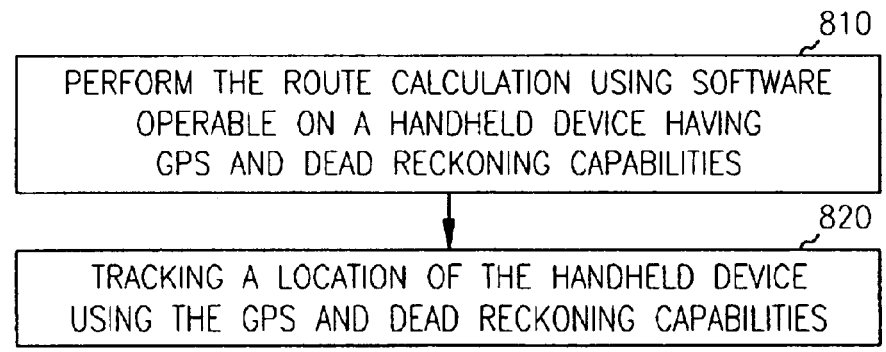
FIG. 8 is a flow diagram of another embodiment of a navigation aid method according to the teachings of the present invention.

FIG. 8 is a flow diagram of another embodiment of a navigation aid method according to the teachings of the present invention. The navigation aid method includes a method for navigation using a handheld electronic device that incorporate triangulation positioning functionality with a complementary navigation related functionality such that the device can continue to provide navigation related services in "urban-canyons" or indoors. As described above, a processor, memory, transceiver, compass, triangulation positioning component, and at least one dead reckoning component are used for processing signals which include input data from input devices, e.g. keypads, other input keys, or other inputs, GPS signals from GPS receiver, rate gyro data signals, accelerometer data signals and the like, e.g. pedometer and/or odometer signals, and data received from I/O ports in order to perform the methods described herein. As shown in FIG. 8, the method includes performing a route calculation using software operable on the handheld device in block 810. According to the teachings of the present invention, the handheld device includes a processor and a memory in communication with the processor. The memory is adapted to store navigation related data. The navigation related data includes cartographic data including a number of locations and data indicative of thoroughfares of a plurality of types connecting certain ones of the locations. According to this embodiment of the present invention, the handheld device includes GPS and dead reckoning capabilities, including at least one of a rate gyro sensor, pedometer sensor, odometer sensor and an accelerometer sensor. In one embodiment, performing a route calculation using a handheld device includes using a multifunction device selected from the group of a multifunction PDA and a multifunction cell phone having a compass.

In block 820, the method further includes tracking a location of the handheld device using the GPS and dead reckoning capabilities. In this embodiment, the method includes using a GPS receiver to determine the location of the device when GPS service is available or highly reliable. And, the method further includes using the dead reckoning capabilities (including at least one of a rate gyro sensor, a pedometer sensor, an odometer sensor and an accelerometer sensor), in complement to the GPS receiver, to determine the location when GPS service is degraded. In one embodiment, tracking a location of the handheld device using the GPS and dead reckoning capabilities in block 820 includes displaying the location on a color cartographic map on a display of the handheld device. In one embodiment, tracking a location of the handheld device using the GPS and dead reckoning capabilities includes tracking a location of the device along a planned route and providing audio route guidance.

In some embodiments, the methods provided above are implemented as a computer data signal embodied in a carrier wave or propagated signal, that represents a sequence of instructions which, when executed by a processor such as processor 410 in FIG. 4A, processor 436 in FIG. 4B, or processor 504 in FIG. 5, cause the processor to perform the respective method. In other embodiments, methods provided above are implemented as a set of instructions contained on a computer-accessible medium, such as memory 430 in FIG. 4A, memory 442 in FIG. 4B or mass storage device 512 in FIG. 5, capable of directing a processor, such as processor 410 in FIG. 4A, processor 436 in FIG. 4B or processor 504 in FIG. 5, to perform the respective method. In varying embodiments, the medium is a magnetic medium, an electronic medium, or an optical medium.

As one of ordinary skill in the art will understand upon reading this disclosure, the electronic components of device shown in FIGS. 4A and 4B, and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured using C programming language or other high level language and assembly. However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to apparatus, systems and methods which incorporate triangulation positioning functionality with a complementary navigation related functionality such that the device can continue to provide navigation related services in "urban-canyons" or indoors. Further, in some embodiments, the apparatus, systems and methods integrate triangulation positioning functionality with other handheld device functionality, e.g. cell phone and/or PDA functionality, in a manner which is not cumbersome to handle or to use.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A method for navigation using a portable navigation device equipped with a GPS receiver and a dead reckoning positioning functionality, the method comprising the steps if:

determining a current position of the device using the GPS receiver so as to calculate a route through a network of thoroughfares;

if the determination of the current position as determined by the GPS receiver is at least partially degraded, determining the current position of the device using the dead reckoning positioning functionality; and if the determination of the current position as determined by the GPS receiver is substantially accurate, calibrating the dead reckoning functionality using the GPS receiver.

2. The method of claim 1, wherein the portable navigation device is a multifunction device selected from the group of a Personal Digital Assistant (PDA) enabled device and a cell phone enabled device.

3. The method of claim 2, wherein the portable navigation device includes an integral compass.

4. The method of claim 3, wherein the portable navigation device includes a distance detection component.

5. The method of claim 4, wherein the distance detection component is a pedometer.

6. The method of claim 1, wherein the portable navigation device is operable to track a movement of the device.

7. The method of claim 1, wherein the method further includes retrieving navigation related data from a memory of the portable navigation device, wherein the navigation related data includes navigation data selected from the group of automobile navigation data, marine craft navigation data, pedestrian navigation data, and hiking navigation data.

8. The method of claim 7, wherein retrieving navigation related data from the memory of the portable navigation device includes retrieving navigation related data selected from the group of a number of waypoints, a planned route, and points of interest.

9. The method of claim 8, wherein retrieving navigation related data for points of interest includes retrieving points of interest selected from the group of geographical points of interest, entertainment venues, dining venues, and lodging venues.

10. A method for navigation using a portable navigation device equipped with a GPS receiver and a dead reckoning positioning functionality, the method comprising the steps of:
   determining a current position of the portable navigation device using the GPS receiver
   calculating a route through a network of thoroughfares represented by a set of data;
   if the determination of the current position as determined by the GPS receiver is at least partially degraded, determining the current position of the device using the dead reckoning positioning functionality so as to continue calculating the route;
   if the determination of the current position as determined by the GPS receiver is substantially accurate, calibrating the dead reckoning functionality using the GPS receiver; and
   if the determination of the current position as determined by the dead reckoning functionality is substantially accurate, calibrating the GPS receiver using the dead reckoning functionality.

11. The method of claim 10, wherein the portable navigation device includes a rate gyro positioning functionality.

12. The method of claim 10, wherein the portable navigation device includes an accelerometer positioning functionality.

13. The method of claim 10, wherein the method further includes software accessible by the portable navigation device for:
   maintaining a track log;
   storing one or more waypoints;
   planning a route; and
   finding points of interest.

14. The method of claim 10, wherein the portable navigation device is selected from the group of a cell phone, a PDA, and an article of intelligent apparel.

15. The method of claim 10, wherein the portable navigation device is a multifunction device, and wherein the method further includes:
   retrieving an address from an address book;
   adding a waypoint as an address in the address book;
   adding a point of interest as an address in the address book;
   storing a planned route;
   retrieving a phone number from a phone list;
   adding a phone number to the phone list; and
   adding an entry in a to-do list.

16. A portable electronic device, comprising:
   a memory to store navigation related data, the navigation related data including data indicative of thoroughfares;
   a GPS receiver for determining a current position of the electronic device;
   a dead reckoning component;
   a processor adapted to communicate with the memory, GPS receiver, and dead reckoning component, wherein the processor is operable to calculate a route through the thoroughfares and is further operable to calibrate the GPS receiver using the dead reckoning component; and
   a portable housing for storing the GPS receiver, the dead reckoning component, and the processor.

17. The portable electronic device of claim 16, wherein the dead reckoning component includes at least one component selected from the group of a rate gyro, a pedometer, and an accelerometer.

18. The portable electronic device of claim 16, wherein the device is selected from the group of a PDA-enabled device and a cell phone-enabled device.

19. The portable electronic device of claim 18, where the PDA-enabled device and the cell phone-enabled device include a compass and an internal power supply.

20. The portable electronic device of claim 16, wherein the navigation data includes navigation data selected from group of one or more waypoints, a route between two or more locations, and one or more points of interest.

21. The portable electronic device of claim 16, wherein the device is operable to determine the current position of the device using the dead reckoning component if the GPS receiver's ability to determine the current position is at least partially degraded.

22. The portable electronic device of claim 21, wherein the dead reckoning component includes at least one of a rate gyro, a pedometer and an accelerometer.

23. The portable electronic device of claim 22, wherein the device includes a display operable to display the location of the device and a route to a desired destination, and wherein the device is adapted to navigate the route to the desired destination using audio and visual guidance.

24. A portable electronic device, comprising:
   a memory adapted to store navigation related data, the navigation related data including data indicative of thoroughfares;
   a GPS receiver for determining a current position of the electronic device;
   a dead reckoning component for determining the current position, such that when the current position as determined by the GPS receiver is partially degraded, the current position as determined by the dead reckoning component may be used to supplement the current position as determined by the GPS receiver;
   a processor adapted to communicate with the memory, GPS receiver, and dead reckoning component and further operable to calibrate the GPS receiver using the current position as determined by the dead reckoning component;

a display operable to display the current position of the device; and a portable housing including the memory, the GPS receiver, the dead reckoning component, the processor and the display.

25. The portable electronic device of claim 24, wherein the dead reckoning component includes at least one component selected from the group of a rate gyro, a pedometer, and an accelerometer.

26. The portable electronic device of claim 24, wherein the thoroughfares include at least one thoroughfare selected from the group of a road, a street, a highway, and an interstate.

27. The portable electronic device of claim 24, wherein the device is selected from the group of a PDA-enabled device and a cell phone-enabled device.

28. The portable electronic device of claim 27, where the PDA-enabled device include a compass and an internal power supply.

29. The portable electronic device of claim 24, wherein the device uses audio and visual guidance direct a user of the device.

* * * * *